Patented Jan. 17, 1933

1,894,604

UNITED STATES PATENT OFFICE

VANDERVEER VOORHEES, OF HAMMOND, INDIANA, ASSIGNOR TO STANDARD OIL COMPANY, OF CHICAGO, ILLINOIS, A CORPORATION OF INDIANA

INSECTIFUGE

No Drawing.   Application filed July 20, 1931. Serial No. 552,068.

This invention relates to a new composition of matter exhibiting insectifugal properties, and the composition is particularly useful in combating insect pests such as flies.

I have found that the polymethyleneyl esters of phthalic acid are effective insectifuges; that they do not produce dermatitis, and may be effectively used as insectifuges in oil emulsions, oleaginous compositions and mineral oil sprays. Also the polymethyleneyl phthalates may be used in combination with other insectifugal and insecticidal compositions such as a mineral oil solution containing pyrethrum and the like.

The insectifugal properties of the polymethyleneyl phthalates, di-cyclohexyl phthalate for example, have been compared with other compositions that exhibit insectifugal properties, and the results from these tests of relative effectiveness conclusively establish the fact that the polymethyleneyl phthalates, or cycloparaffin esters of phthalic acid, are very effective as insect repellants. Among the insectifuges compared with the polymethyleneyl phthalates were the alkyl phthalates, and particularly dibutyl phthalate.

The relative effectiveness of the insectifugal properties of di-cyclohexyl phthalate and other compounds, dibutyl phthalates, for example, may be very clearly illustrated by the following method and apparatus: A glass tube about 20 inches long and 3 inches in diameter with a one-half inch hole cut in the middle was used as a testing cage. A small dish containing a 2% solution of di-cyclohexyl phthalate in white oil was placed at one end of the tube and at the other end was placed a small dish of a 2% solution of dibutyl phthalate in white oil. The ends of the tube were closed with rubber stoppers, and a small glass tube was passed through each stopper and dipped into the small dish of oil solution near the ends of the cage. A convenient number of flies were introduced through the hole in the middle of the tube, and a slow stream of air was bubbled through each solution. The hole in the center of the tube remained open during the test to provide an exit for the air and vaporized materials. After the flies had remained in the tube for a short time they would congregate in the end of the apparatus that contained the material exhibiting the least repellant effect.

The following table shows the results obtained when the repellant effectiveness of di-cyclohexyl phthalate was compared with the repellant effectiveness of dibutyl phthalate.

| No. of flies in dibutyl phthalate end | No. of flies in cyclohexyl phthalate end | Relative effectiveness |
|---|---|---|
| 6 | 3 | 2 |
| 5 | 2 | 2.5 |
| 6 | 2 | 3 |

From the above table it is readily seen that the repellant effectiveness of di-cyclohexyl phthalates is from two to three times greater than that of dibutyl phthalate. For the purpose of this invention I may use the di-polymethyleneyl phthalates, substituted di-polymethyleneyl phthalates, and mixed polymethyleneyl phthalates; for example, di-cyclopentyl phthalate, di-cyclohexyl phthalate, di-methylcyclohexyl phthalate and cyclopentyl cyclohexyl phthalate. For examples of the mixed alkyl polymethyleneyl phthalates I may use butyl cyclohexyl phthalate, propyl cyclohexyl phthalates, butyl cyclopentyl phthalate, butyl methylcyclohexyl phthalate, etc. The compounds suitable for my invention have the following general formula:

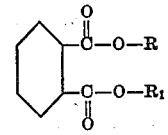

wherein R and $R_1$ may be the same or different polymethyleneyl or substituted polymethyleneyl radicals. For the mixed alkyl esters, R represents an alkyl radical and $R_1$ represents a polymethyleneyl or substituted polymethyleneyl radical.

For the purpose of this invention the polymethyleneyl phthalates may be dissolved in mineral oils of any desired viscosity or A. P. I. gravity and the concentration of the esters may be varied according to the strength needed for the particular insect. If the cyclohexyl phthalates are to be used as insect repellants, white oil, which is a non-irritant refined oil having a viscosity from 70 to 90 Saybolt at 100° F., may be used as a suitable vehicle, and the cyclohexyl phthalates may be used in concentrations from 1 to 10%. The following composition has been found very effective as a cattle fly repellant.

*Example 1*

| | Per cent |
|---|---|
| Mineral oil 80–85 Saybolt viscosity at 100° F. | 96 |
| Cyclohexyl phthalates | 4 |

Also a very satisfactory insecticidal and insectifugal composition can be produced by adding polymethyleneyl phthalates to a mineral oil solution containing the oil soluble principles from pyrethrum flowers or the like. It should be appreciated that various concentrations of these phthalates may be used in the above compositions without departing from the scope of the invention as herein described.

I claim:

1. An insectifuge comprising a di-polymethyleneyl phthalate.
2. An insectifuge, comprising a substituted di-polymethyleneyl phthalate.
3. An insectifuge comprising an alkyl polymethleneyl phthalate.
4. An insectifuge comprising a di-cyclohexyl phthalate.
5. An insectifuge comprising a mineral oil and a di-polymethyleneyl phthalate.
6. An insectifuge comprising a mineral oil solution and di-cyclohexyl phthalate.
7. An insectifuge comprising non-irritant highly refined mineral oil and cyclohexyl phthalate.
8. An insectifuge comprising an ester of the following general formula:

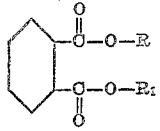

wherein R and R₁ may be the same or different polymethyleneyl radicals.

9. An insectifuge comprising an ester of the following general formula:

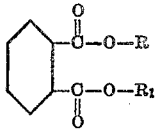

wherein R and R₁ may be the same or different substituted polymethyleneyl radicals.

10. An insectifuge comprising a mixed ester of the following general formula:

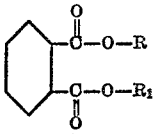

wherein R represents an alkyl radical and R₁ represents a substituted polymethyleneyl radical.

11. An insectifuge comprising butyl cyclohexyl phthalate.
12. An insectifuge comprising propyl cyclohexyl phthalate.

In witness whereof I have affixed my signature.

VANDERVEER VOORHEES.